Patented Nov. 25, 1947

2,431,470

UNITED STATES PATENT OFFICE 2,431,470

AMMONIA EVOLVING COMPOSITION

Walter Hugh Fawkes, Harefield, England

No Drawing. Application May 10, 1944, Serial No. 535,000. In Great Britain April 30, 1943

3 Claims. (Cl. 252—189)

This invention relates to means for ensuring the controlled dissemination of gases into a surrounding body of gas, such as the atmosphere in a relatively confined space, and is concerned more particularly with the dissemination of ammonia for the purpose of modifying to a determined degree the pH value of the atmosphere, for example, in a factory or store-room.

It is well-known that certain solid ammonium compounds alone or in admixture with solid alkaline substances, will decompose under normal conditions of temperature and humidity to evolve ammonia gas and that commercial ammonium carbonate contains ammonium carbamate and effloresces on exposure to the atmosphere with evolution of ammonia gas.

The object of the present invention is to provide means whereby such evolution of ammonia may be controlled, in the sense that it is spread over a longer period of time than would normally be the case, without the use of apparatus or equipment. The invention therefore comprises means for use in securing the controlled dissemination of ammonia gas into a relatively confined space consisting in a compressed block composed of an intimate mixture of a solid substance, or mixture of solid substances, adapted to evolve ammonia under normal conditions of temperature and humidity and a further substance which gradually crumbles, effloresces or otherwise disintegrates when exposed to the air.

The nature of the invention will be clearly understood from the following description, given by way of example, of one form thereof.

In the example chosen, it is desired to disseminate ammonia for the purpose of modifying to a determined degree the pH value of the atmosphere in a factory or store-room.

A suitable ammonia-evolving mixture of solid substances in this case contains a large proportion of neutral ammonium carbonate, which in its pure form would not evolve ammonia when exposed to dry air, and a small proportion, say 1.6% by weight, of ammonium carbamate which has a catalytic effect and will cause the ammonium carbonate to give off a large amount of its combined ammonia, as much as 97% in most cases, when the mixture is exposed to normal atmospheric conditions of temperature and humidity.

The evolution of the gas would normally occur in a very short space of time if a loose mixture were employed and, in order to produce the result aimed at by the present invention, the intimate mixture of ammonium carbonate and ammonium carbamate is first thoroughly mixed with a substance which gradually crumbles, effloresces and otherwise disintegrates when exposed to the air and then the whole mixture is compressed into a solid block. An efflorescent substance which is highly suitable for the example chosen is crystalline sodium carbonate. It may be admixed in the proportion of about 20 parts by weight to 80 parts by weight of the mixture of ammonium salts.

The block thus produced initially has a relatively small surface area exposed to the action of the air but while ammonia is being evolved from the surface layer of the block the sodium carbonate in the said layer effloresces and causes a gradual crumbling or disintegration of the said surface so that fresh areas of the block composition continuously become exposed to the air. This process continues until the whole of the block composition has yielded up its ammonia and in this way a steady evolution of ammonia is secured at a rate determined both by the rate at which the disintegrating agent operates to break up the surface of the block and by the compactness of the material of the block produced by the compression thereof. Pressures in the region of 350 lbs. per square inch produce a very saitsfactory block but for different purposes the pressure employed may range between 250 and 600 lbs. per square inch. As an example, a block of the composition described above which has been compacted under a pressure of 350 lbs. per square inch will evolve ammonia at a relatively steady rate over a period of days.

The pressure used in the manufacture of the block is varied in accordance with the humidity of the atmosphere in which it is to be used and in accordance with the rate of evolution of gas required.

What I claim is:

1. As a new article of manufacture, a compacted block of ammonia evolving material composed of intimately intermingled particles of neutral ammonium carbonate, ammonium carbamate and crystalline sodium carbonate, in the proportions of about 80% by weight of the ammonium salts to about 20% by weight of the sodium salt, compressed at a pressure of between 250 and 600 lbs. per square inch.

2. As a new article of manufacture, a compacted block of ammonia evolving material composed of intimately intermingled particles of neutral ammonium carbonate, ammonium carbamate and crystalline sodium carbonate compressed at a pressure of between 250 and 600 lbs. per square inch, the proportions of the ingredients being about 80% by weight of a mixture containing 98.4% of ammonium carbonate with 1.6% of ammonium carbamate and about 20% by weight of crystalline sodium carbonate.

3. A block as claimed in claim 2, compressed at a pressure of 350 lbs. per square inch.

WALTER HUGH FAWKES.

REFERENCES CITED

The following references are of record in the file of this patent:

UNITED STATES PATENTS

| Number | Name | Date |
|---|---|---|
| 854,533 | Sanborn | May 21, 1907 |
| 1,150,901 | Strickler | Aug. 24, 1915 |
| 2,008,489 | Cousins | July 16, 1935 |

FOREIGN PATENTS

| Number | Country | Date |
|---|---|---|
| 16,458 | Great Britain | 1893 |
| 462,321 | Great Britain | Mar. 8, 1937 |

OTHER REFERENCES

The Cosmetic Formulary, vol. I, Bennett, Chem. Pub. Co. of N. Y., Inc. (1937), page 232.

Perfumes, Cosmetics and Soaps, Poucher, vol. III, D. Van Nostrand Co., Inc., N. Y. C. (1942), page 172.

Merck's Index, 4th edition, Merck & Co., Inc., Rahway, N. J. (1930), page 70.